(12) United States Patent
Ruf et al.

(10) Patent No.: US 11,171,348 B2
(45) Date of Patent: Nov. 9, 2021

(54) METHOD FOR OPERATING A FUEL CELL SYSTEM AND A FUEL CELL VEHICLE

(71) Applicant: AUDI AG, Ingolstadt (DE)

(72) Inventors: Markus Ruf, Waldstetten (DE); Kai Müller, Bretzfeld (DE)

(73) Assignee: AUDI AG, Ingolstadt (DE)

( * ) Notice: Subject to any disclaimer, the term of this patent is extended or adjusted under 35 U.S.C. 154(b) by 37 days.

(21) Appl. No.: 16/694,322

(22) Filed: Nov. 25, 2019

(65) Prior Publication Data
US 2020/0168928 A1 May 28, 2020

(30) Foreign Application Priority Data
Nov. 26, 2018 (DE) ...................... 10 2018 129 659.2

(51) Int. Cl.
*H01M 8/04537* (2016.01)
(52) U.S. Cl.
CPC ... *H01M 8/04589* (2013.01); *H01M 8/04559* (2013.01); *H01M 8/04619* (2013.01); *H01M 8/04649* (2013.01)
(58) Field of Classification Search
CPC ......... H01M 8/04589; H01M 8/04559; H01M 8/04619; H01M 8/04649
See application file for complete search history.

(56) References Cited

U.S. PATENT DOCUMENTS 4,962,462 A * 10/1990 Fekete ................ H01M 16/006
700/297
2009/0197125 A1 8/2009 Salvador et al.

FOREIGN PATENT DOCUMENTS

| DE | 10 2015 225 353 A1 | 6/2017 |
| DE | 10 2015 225 354 A1 | 6/2017 |
| DE | 102015225354 * | 6/2017 |
| KR | 10-2018-0031369 A | 3/2018 |

* cited by examiner

*Primary Examiner* — Olatunji A Godo
(74) *Attorney, Agent, or Firm* — Seed Intellectual Property Law Group LLP

(57) ABSTRACT

A method for operating a fuel cell system comprising a control unit and at least one fuel cell comprises a cycle of the following steps: recording of an actual U/I characteristic curve of the fuel cell, comparison of the recorded actual U/I characteristic curve of the fuel cell with a target U/I characteristic curve stored in a memory, at least within a predetermined or pre-determinable current range, and determination of the difference between the target U/I characteristic curve and the actual U/I characteristic curve within the current range, comprising the following steps: continuous or clocked repetition of the cycle until the difference reaches or exceeds a predetermined or pre-determinable difference limit value, and adjustment of at least one parameter of the control unit to reduce or minimize the difference.

10 Claims, 2 Drawing Sheets

METHOD FOR OPERATING A FUEL CELL SYSTEM AND A FUEL CELL VEHICLE

BACKGROUND

Technical Field

Embodiments of the invention relate to a method for operating a fuel cell system comprising a control unit and at least one fuel cell, such as a fuel cell stack comprising a plurality of fuel cells connected in series. Embodiments of the invention also relate to a fuel cell vehicle.

Description of the Related Art

US 2009/0197125 A1 relates to a method with a cycle, in which the current density is divided into individual ranges and a cell voltage of the fuel cell is calculated from the respective individual range in order to subsequently compare it with a predetermined cell voltage. If the deviation is below a predetermined limit value, the algorithm selects the next range and recalculates the voltage value of the cells, wherein a new comparison of a target voltage is also made here in order to determine a deviation. All areas are gone through, wherein the maximum output power of the fuel cell stack can be determined. This is of particular interest if the fuel cell stack is subject to degradation effects, which reduce the efficiency of the fuel cell stack, in the course of time. The operating points of the fuel cell system are then adjusted on the basis of the new polarization curve estimated by the algorithm. Such an operating point can be, for example, an operating point concerning the relative humidity of the membrane. This relative humidity is controlled, for example, by the humidity of the reaction media supplied to the fuel cell stack. An additional method for increasing the efficiency of a fuel cell stack is described in KR 2018 0 031 369 A, wherein several indicators of wear on the fuel cell stack are measured here and degradation effects are subsequently prevented.

BRIEF SUMMARY

Embodiments of the present invention provide a simplified and more efficient method for operating a fuel cell system. In addition, embodiments of the present invention provide a corresponding fuel cell vehicle.

According to embodiments of the present invention, a method may comprise performing a cycle including the following steps: recording of an actual U/I characteristic curve (actual voltage-current characteristic curve) of the fuel cell; comparison of the recorded actual U/I characteristic curve of the fuel cell with a target U/I characteristic curve (target voltage-current characteristic curve), which is stored in a memory, such as in a memory of the control unit, at least within a predetermined or pre-determinable current range; and determination of the difference between the target U/I characteristic curve and the actual U/I characteristic curve within the current range.

The method may be characterized by the following steps:
continuous or clocked repetition of the cycle until the difference reaches or exceeds a predetermined or pre-determinable difference limit value; and
adjustment of at least one parameter of the control unit to reduce or minimize the difference.

Embodiments of the invention are therefore based on the knowledge that many parameters within the control unit are hard-coded or fixed and therefore do not change during the life cycle of the fuel cell system. Over the course of time, deviations from the fixed values occur during operation, which results, for example, in pressure losses, contamination, a reduced U/I characteristic curve or a different type of aging of the fuel cell. The method according to an embodiment of the invention now provides for a corresponding adaptation of control unit parameters, which were previously always fixed, to the current system behavior, whereby increased accuracy and increased efficiency can be achieved for the system behavior of the fuel cell system. After their adaptation, the parameters may be stored in the memory, such as in the (non-volatile) memory of the control unit.

It is possible that the parameter adjusted in the control unit is compared with an actually measured value of this parameter of the fuel cell, and that the parameter in the control unit is adjusted again if a predetermined or pre-determinable deviation is determined. By adapting or adjusting the parameter in the control unit and subsequently validating the adjusted parameter by measuring the actual physical parameter, the adjusted parameter can be validated within the control unit.

In this connection, for example, it proved to be advantageous if the parameter of the control unit to be adjusted is a membrane resistance of the fuel cell or a membrane resistance of the membranes within a fuel cell stack.

The membrane resistance, among other parameters, has an influence on the electrochemical kinetics of the fuel cell, which follows a simplified Butler-Volmer equation with regard to its current curve in a U/I characteristic map. Accordingly, the passing current density i can be expressed as $$i = i_0 \left[ \frac{c_{ox}(0,t)}{c_{ox}^b} e^{\alpha z F \eta / RT} - \frac{c_{red}(0,t)}{c_{red}^b} e^{-(1-\alpha)z F \eta / RT} \right]$$

In order to validate the membrane resistance R, which was adjusted in the control unit, it has proved to be advantageous if the membrane resistance R is additionally determined by means of impedance spectroscopy and then compared with the values of the parameter for the membrane resistance R in the control unit. If a predetermined or pre-determinable deviation of the values of this parameter is determined, this leads to a further adjustment of this parameter in the control unit.

As can be seen from the simplified equation shown above, the current flow is also dependent on the exchange current density $I_0$ so that it has proved advantageous if the parameter of the control unit to be adjusted is the exchange current density of the fuel cell. Alternatively or in addition, one of the parameters of the control unit to be adjusted can also be a penetration factor $\alpha$ of the fuel cell.

In order to ensure that a reliable determination of a difference or deviation is made, it has proved to be advantageous if the current range maintains a minimum distance of 250 amperes between a first test load point and a second test load point. This is of particular interest if, for example, the operating current range between 0 and 500 amperes is twice as large. This allows a detailed system behavior to be generated, which is available after the optimization of a new adaptation parameter set.

Typically, the U/I characteristic curves are determined at an open-circuit voltage of the fuel cell or fuel cell stack, but it is also possible that current-voltage pairs are recorded during the operation of the fuel cell system under load. These current-voltage pairs can then optionally be supplied to a further evaluation or a further parameter comparison in the control unit. If it is determined that the actual current-voltage pairs do not correspond to the characteristic curve stored in the control unit, an alarm signal or a test signal can be generated and output.

The aforementioned parameters are often very computationally intensive, as far as their adaptation within the control unit is concerned, so that such an adjustment places a heavy load on the control unit in terms of performance. It is therefore advantageous if the adjustment of the at least one parameter takes place only if a utilization of the control unit has fallen below a predetermined or pre-determinable degree of utilization. Such a low degree of utilization occurs, for example, after the fuel cell system, such as the fuel cell vehicle, has been stopped.

One embodiment of a fuel cell vehicle has a fuel cell system comprising at least one fuel cell and a control unit designed to perform a cycle comprising:
 recording of an actual U/I characteristic curve of the fuel cell;
 comparison of the recorded actual U/I characteristic curve of the fuel cell with a target U/I characteristic curve stored in a memory, at least within a predetermined or pre-determinable current range; and
 determination of the difference between the target U/I characteristic curve and the actual U/I characteristic curve within the current range,
wherein the control unit is designed to repeat the cycle on a continuous or clocked basis until the difference reaches or exceeds a predetermined or pre-determinable difference limit value, and wherein the control unit is designed to subsequently adjust at least one parameter of the control unit to reduce or minimize the difference. The adjusted parameters may be stored in the memory, such as in the memory of the control unit.

This fuel cell vehicle is characterized by an efficient maintenance strategy, since the maintenance intervals can be significantly extended due to the individual adjustability of the parameters within the control unit. This results in an automatic adaptability of the fuel cell system to its degree of aging.

The features and combinations of features mentioned above in the description and the features and combinations of features mentioned below in the description of the figures and/or shown in the figures alone can be used not only in the combination given in each case but also in other combinations or individually. Thus, designs that are not explicitly shown or explained in the figures but result from and can be produced through separate combinations of features from the embodiments described are thus also to be regarded as covered and disclosed.

BRIEF DESCRIPTION OF THE SEVERAL VIEWS OF THE DRAWINGS

Further advantages, features, and details result from the claims, the following description of embodiments, and from the drawings. The following is shown:

DETAILED DESCRIPTION

Figure 1:
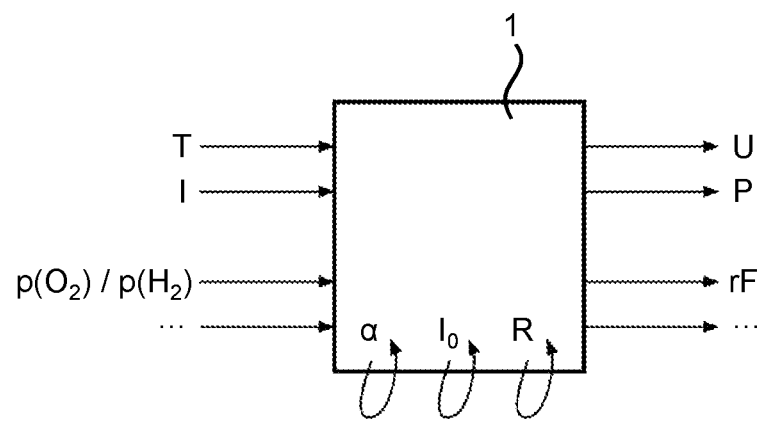
FIG. 1 is a schematic control unit with various input parameters, with various output parameters and with various adjustable parameters.

FIG. 1 schematically describes a control unit 1 of the fuel cell system of the fuel cell vehicle, wherein the control unit 1 receives various values for input parameters. The load requirement I (current strength), the temperature T measured by a temperature sensor and the pressures p of the reaction media ($O_2$ and $H_2$) are plotted only by way of example. The input of further input parameters is illustrated by the arrow with three dots shown on the left of control unit 1. The input parameters are used to generate corresponding output parameters, wherein a penetration factor $\alpha$ or a charge transfer coefficient of the fuel cell is used for this purpose. In addition, an exchange current strength $I_0$ can also be taken into account in the control unit, wherein the membrane resistance R is also taken into account. By means of corresponding operations within the control unit, a voltage U, a power P or a relative humidity rF can then be specified for the membranes or for the reaction media fed to the membrane. The output of additional output parameters is possible, wherein, for this purpose, an arrow with three dots on the right likewise illustrates this.

In this case, the method for operating a fuel cell system comprising the control unit 1 and at least one fuel cell runs through a cycle of the following steps: Initially, an actual U/I characteristic curve 2 of the fuel cell is recorded and compared with a target U/I characteristic curve 3 stored in a memory of the control unit 1 within a predetermined current range 4. A difference 5 is then determined between the target U/I characteristic curve 3 and the actual U/I characteristic curve 3 within the current range 4.

Figure 2:
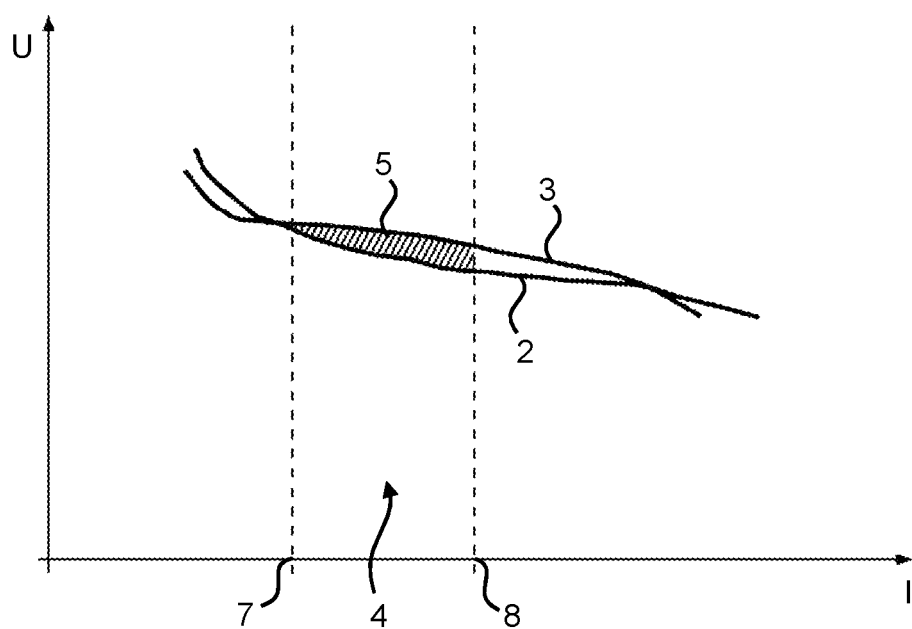
FIG. 2 is a characteristic map in which an actual U/I characteristic curve and a target U/I characteristic curve are plotted.
Figure 3:
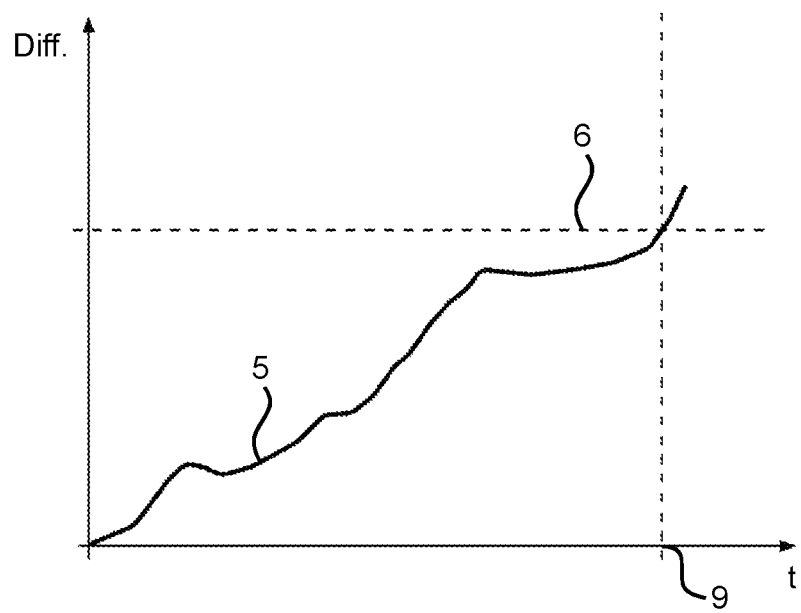
FIG. 3 is the difference plotted over time resulting from the actual U/I characteristic curve and the target U/I characteristic curve, in particular a repeated evaluation of the difference over time.

The difference 5 is indicated in FIG. 2 by the hatched area. This difference 5 is calculated or determined repeatedly. This means that the cycle mentioned above is repeated on a continuous or clocked basis until the difference 5 reaches or exceeds a predetermined or pre-determinable difference limit value 6, as plotted in FIG. 3 in the present case. When the difference 5 of the difference limit value 6 is reached, at least one of the parameters of the control unit 1 is adjusted at point in time 9 in order to reduce or minimize the difference 5. However, the point in time 9 of the adjustment can also be delayed and can, for example, only take place if the user requests the adjustment and actively triggers the adjustment by pressing a control element. Adjusted parameters are then stored in the memory of the control unit 1.

As indicated in FIG. 1 by the arrows shown in curved or bent form, it has proved to be advantageous if the parameter of the control unit 1 to be adjusted is the membrane resistance R of the fuel cell. Alternatively or in addition, the parameter of the control unit 1 to be adjusted can also be the exchange current density $I_0$ of the fuel cell. In addition, it is possible that the parameter of the control unit 1 to be adjusted is the penetration factor $\alpha$ of the fuel cell.

It is also advantageous if the aforementioned and adjusted parameters are validated. This takes place by means of a suitable measurement of the values for this parameter. In the example of the membrane resistance R, this can be measured by means of impedance spectroscopy, wherein the measured values of the parameter can be compared with the values stored in the control unit 1. If the deviation is too large, the parameter for the membrane resistance R is adjusted once again within the control unit 1. The same applies to the other two parameters shown, the penetration factor $\alpha$ and the exchange current density $I_0$.

As FIG. 2 again shows, it is necessary for the formation of a difference that a sufficiently large current range 4 is taken into account, which may be given by the fact that the current range 4 maintains a minimum distance of 250 amperes between a first test load point 7 and a second test load point 8, such as if a current intensity range from 0 amperes to 500 amperes is feasible with the fuel cell device.

Since the adjustment of the at least one parameter can be very computationally intensive in some cases, it has proved to be advantageous that the at least one parameter is only adjusted or is only possible if the utilization of the control unit 1 has fallen below a predetermined or pre-determinable degree of utilization.

Thus, through one embodiment of a method according to the invention and one embodiment of a fuel cell vehicle according to the invention, values are specified which allow conclusions to be drawn about the aging state of the fuel cell system, which can thus be used to adjust or change the inspection interval or to change the mode of operation. In this connection, a particularly resource-saving system has been created since maintenance intervals are extended.

German patent application no. 10 2018 129 659.2, filed Nov. 26, 2018, to which this application claims priority, is hereby incorporated herein by reference, in its entirety. The various features and aspects of the embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for operating a fuel cell system comprising a control unit and at least one fuel cell, comprising:
   performance of a cycle including:
      recording of an actual U/I characteristic curve of the fuel cell;
      comparison of the recorded actual U/I characteristic curve of the fuel cell with a target U/I characteristic curve stored in a memory, at least within a predetermined or pre-determinable current range; and
      determination of a difference between the target U/I characteristic curve and the actual U/I characteristic curve within the current range;
   continuous or clocked repetition of the cycle until the difference reaches or exceeds a predetermined or pre-determinable difference limit value; and
   adjustment of at least one parameter of the control unit to reduce or minimize the difference.

2. The method according to claim 1, wherein the parameter adjusted in the control unit is compared with an actually measured value of this parameter of the fuel cell, and the parameter in the control unit is adjusted again if a predetermined or pre-determinable deviation is determined.

3. The method according to claim 1, wherein one of the parameters of the control unit to be adjusted is a membrane resistance of the fuel cell.

4. The method according to claim 3, wherein the membrane resistance of the fuel cell is determined by impedance spectroscopy and compared with values of the parameter for the membrane resistance in the control unit, and, if a predetermined or pre-determinable deviation of the parameter in the control unit is determined, it is adjusted once again.

5. The method according to claim 1, wherein one of the parameters of the control unit to be adjusted is an exchange current density of the fuel cell.

6. The method according to claim 1, wherein one of the parameters of the control unit to be adjusted is a penetration factor of the fuel cell.

7. The method according to claim 1, wherein the current range maintains a minimum distance of 250 amperes between a first test load point and a second test load point.

8. The method according to claim 1, wherein current-voltage pairs are recorded under load during the operation of the fuel cell system and supplied to a further evaluation or a further parameter comparison in the control unit.

9. The method according to claim 1, wherein the adjustment of the at least one parameter only takes place if a utilization of the control unit has fallen below a predetermined or pre-determinable degree of utilization.

10. A fuel cell vehicle with a fuel cell system comprising at least one fuel cell and with a control unit designed to perform a cycle comprising:
   recording of an actual U/I characteristic curve of the fuel cell;
   comparison of the recorded actual U/I characteristic curve of the fuel cell with a target U/I characteristic curve stored in a memory, at least within a predetermined or pre-determinable current range; and
   determination of a difference between the target U/I characteristic curve and the actual U/I characteristic curve within the current range,
   wherein the control unit is designed to repeat the cycle on a continuous or clocked basis until the difference reaches or exceeds a predetermined or pre-determinable difference limit value, and then to adjust at least one parameter of the control unit to reduce or minimize the difference.

* * * * *